United States Patent
Jause et al.

(10) Patent No.: US 9,625,151 B2
(45) Date of Patent: Apr. 18, 2017

(54) COOLED COMBUSTOR LINER GROMMET

(71) Applicant: United Technologies Corporation, Farmington, CT (US)

(72) Inventors: Jonathan M. Jause, Manchester, CT (US); Dennis John Duhamel, Oakdale, CT (US); James B. Hoke, Tolland, CT (US); John S. Tu, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 143 days.

(21) Appl. No.: 13/626,285

(22) Filed: Sep. 25, 2012

(65) Prior Publication Data

US 2014/0083112 A1 Mar. 27, 2014

(51) Int. Cl.
*F23R 3/06* (2006.01)
*F23R 3/00* (2006.01)

(52) U.S. Cl.
CPC .......... *F23R 3/002* (2013.01); *F23R 3/06* (2013.01); *F23R 2900/00005* (2013.01); *F23R 2900/03042* (2013.01); *Y02T 50/675* (2013.01); *Y10T 16/05* (2015.01)

(58) Field of Classification Search
CPC .... F23R 3/002; F23R 3/04; F23R 3/06; F23R 2900/00005; F23R 3/03042; F02C 7/18; F02C 7/28; Y10T 16/05; Y02T 50/675
USPC ............. 60/759, 754, 752, 755, 760
See application file for complete search history.

(56) References Cited

U.S. PATENT DOCUMENTS

| | | | |
|---|---|---|---|
| 3,690,096 A | 9/1972 | Harry | |
| 4,132,066 A * | 1/1979 | Austin et al. | 60/752 |
| 4,622,821 A | 11/1986 | Madden | |
| 4,653,279 A | 3/1987 | Reynolds | |
| 4,700,544 A | 10/1987 | Fucci | |
| 6,408,629 B1 * | 6/2002 | Harris | F23R 3/06 60/754 |
| 7,013,634 B2 * | 3/2006 | Pidcock | F23R 3/002 60/39.821 |
| 7,640,752 B2 * | 1/2010 | Gautier et al. | 60/796 |
| 8,479,490 B2 * | 7/2013 | Zupanc et al. | 60/39.821 |
| 2009/0064657 A1 | 3/2009 | Zupanc | |
| 2009/0120095 A1 * | 5/2009 | Berry et al. | 60/754 |
| 2010/0212324 A1 * | 8/2010 | Bronson et al. | 60/752 |

OTHER PUBLICATIONS

International Search Report and Written Opinion for related International Application No. PCT/US13/54936; report dated ;Jan. 9, 2014.
Search Report for related European Application No. EP 13841217; report dated Aug. 21, 2015.

* cited by examiner

*Primary Examiner* — Ehud Gartenberg
*Assistant Examiner* — Jason H Duger
(74) *Attorney, Agent, or Firm* — Cantor Colburn LLP

(57) ABSTRACT

A combustor liner grommet is disclosed. The grommet may include a peripheral wall defining a hole in a combustor liner and further including at least one cooling air flow channel. The cooling air flow channel in the grommet wall may be a slot or a hole. The channel may increase cooling flow to the grommet and the combustor liner around the grommet to prevent cracking from heat stress.

7 Claims, 4 Drawing Sheets

COOLED COMBUSTOR LINER GROMMET

FIELD OF THE DISCLOSURE

The present disclosure generally relates to gas turbine engines and, more specifically, relates to grommets used with combustor liners in gas turbine engines.

BACKGROUND OF THE DISCLOSURE

A gas turbine engine, typically used as a source of propulsion in aircraft or for power generation, largely operates by drawing in ambient air into a compressor, mixing that compressed air with a fuel in a combustor, igniting the air and fuel mixture, and then directing the resulting exhaust gases from the combustion process into a turbine.

Typically, an igniter generates an electrical spark to ignite the air-fuel mixture. The products of the combustion and the remains of the air-fuel mixture then travel out of the combustion chamber as exhaust and through the turbine. The turbine, having a plurality of blades extending from a center body, is forced to rotate as the exhaust passes through the turbine blades. The turbine and the compressor are connected to a common shaft running through the center of the engine. Thus, as the turbine rotates due to the influx of the expanding exhaust gases, the compressor in turn is caused to rotate and bring in and compress new air. Once started, it can thereby be seen that this process is self-sustaining.

Combustion chambers for gas turbine engines typically are annular in shape, and are defined by a combustor shell having a liner. An air passage is typically formed between the combustor shell and the liner to provide cooling air. More specifically, the combustor shell may include an outer combustor shell and an inner combustor shell, each having an associated liner. An outer liner may be disposed radially inside the outer shell and an inner liner may be disposed radially outside of the inner shell. The combustion chamber is the resulting annular space defined between the inner and outer liners.

In such a combustor, one or more igniters are disposed circumferentially around the annular combustion chamber, with each igniter typically being disposed in an opening extending through the outer combustor shell and the outer liner and into the combustion chamber. A separate opening is provided for each igniter. In some combustion chambers, the liners may be segmented into panels, with one of the panels of the outer liner being designated as an igniter panel and having the aforementioned openings for disposition of the igniters.

The air exiting the compressor in such an engine is typically split or bifurcated, with a portion of the compressed air being used for combustion, and a portion of the compressed air being used for cooling purposes. To prevent the compressed air typically used for cooling the combustion chamber from entering the combustion chamber through the openings provided for the igniters, a seal and grommet are typically disposed around each igniter. But for such seals, any influx of the cooling air around the igniters may degrade engine performance in terms of reliable ignition, maintenance of the proper ratio of air to fuel, and disruption of the flow of the air-fuel mixture in the combustion chamber.

While effective, as gas turbine combustion engines have advanced, temperatures in the combustion chamber, and more specifically the areas around the igniters, have increased during operation. These increased temperatures can detrimentally affect engine components, including the outer liner and outer combustor shell. For example, a crack in the outer liner and/or outer combustor shell in the area around the igniter can form from excessive heating of the area around the igniter. Deformations of the outer liner and/or outer combustor shell can also cause degradation in igniter performance, thereby decreasing engine efficiency and possibly necessitating repair or replacement of such components.

SUMMARY OF THE DISCLOSURE

In accordance with one aspect of the disclosure, a grommet of a combustor liner is disclosed. The grommet may include a peripheral wall defining a hole in the liner. At least one cooling air flow channel may be in the peripheral wall.

In a refinement, the at least one cooling air flow channel in the peripheral wall may be a slot.

In another refinement, the at least one cooling air flow channel in the peripheral wall may be a hole.

In a further refinement, the at least one cooling air flow channel spans at least 126 degrees around a circumference of the peripheral wall.

In another refinement, a plurality of cooling air flow channels may be provided in the peripheral wall.

In another refinement, the plurality of cooling air flow channels may be equidistantly spaced around the circumference of the peripheral wall.

In another refinement, about 35% of a circumference of the wall may be occupied by the plurality of cooling air flow channels.

In accordance with another aspect of the disclosure, a combustor liner is disclosed. The combustor liner may include a panel at least partially defining a combustion chamber and having at least one opening. The liner may further include a grommet proximate the opening and having a peripheral wall, with the wall having at least one cooling air flow channel.

In a refinement, the combustor liner opening is adapted to receive an igniter.

In another refinement, the at least one cooling air flow channel is a slot.

In another refinement, the at least one cooling air flow channel is a hole.

In another refinement, the slot spans at least 126 degrees around a circumference of the peripheral wall.

In yet another refinement, a plurality of cooling air flow channels are provided in the peripheral wall.

In another refinement, the plurality of cooling air flow channels are equidistantly spaced around the circumference of the peripheral wall.

In another refinement, about 35% of a circumference of the peripheral wall may be occupied by the plurality of cooling air flow channels.

In accordance with yet another aspect of the disclosure, a method of cooling a combustor liner grommet and combustor liner is disclosed. The method may include providing grommet at an opening of the combustor liner with the grommet having a peripheral wall with at least one cooling air flow channel, and communicating cooling air through the at least one cooling air flow channel in the grommet.

In a refinement, the method further includes providing a plurality of cooling air flow channels in the peripheral wall and wherein the communicating involves directing cooling air through each of the cooling air flow channels.

In another refinement, the method further includes providing the grommet at an igniter opening in the combustor liner, positioning an igniter in the igniter opening, and communicating the cooling air through the at least one cooling air flow channel proximate the igniter.

In yet another refinement, the method further includes creating a film of cooling air exiting the cooling air flow channel against an inside surface of the combustor liner.

In other refinement, the method further includes cooling the grommet and combustor liner by at least 200 degrees Fahrenheit with the cooling air exiting the at least one cooling air flow channel in the peripheral wall.

These and other aspects and features of the present disclosure will be better understood in light of the following detailed description when read in light of the accompanying drawings.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Figure 1:
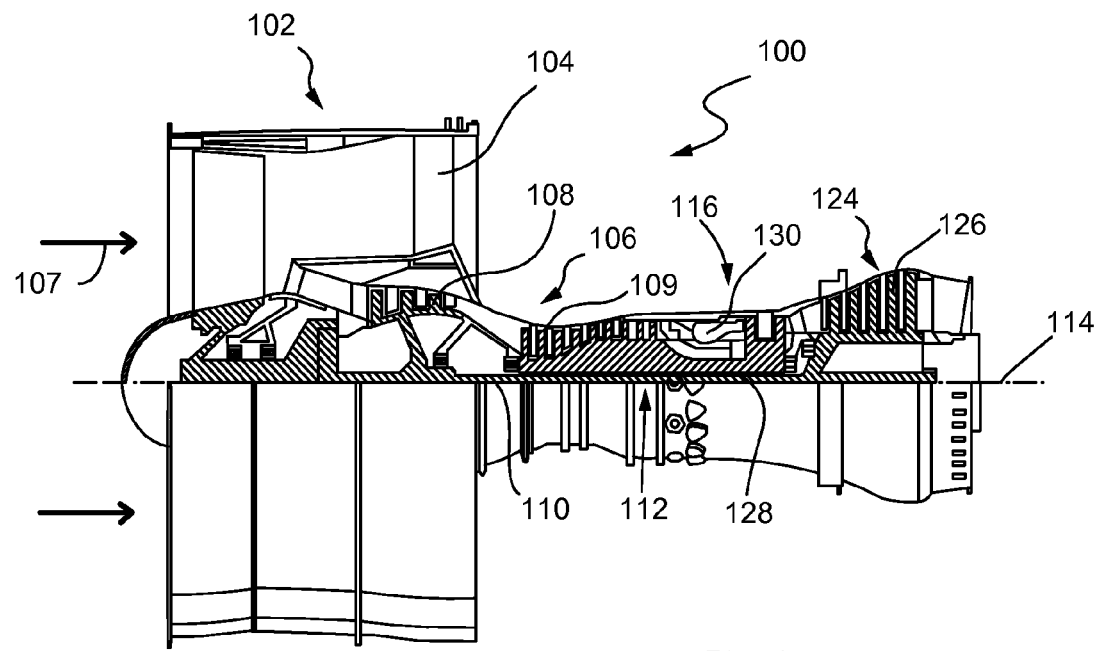
FIG. 1 is a cross sectional view of a gas turbine engine constructed in accordance with the present disclosure.
Figure 2:
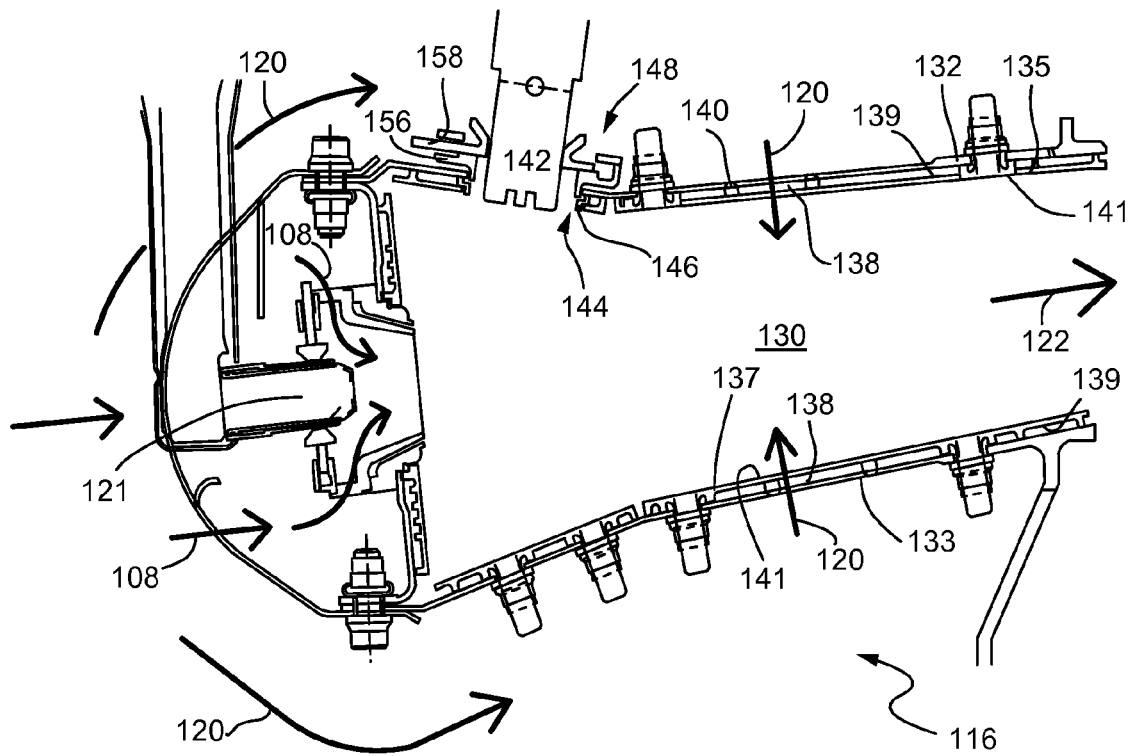
FIG. 2 is a cross sectional view of a combustion chamber constructed in accordance with the present disclosure.

Referring now to the drawings, and with specific reference to FIG. 1 and FIG. 2, a gas turbine engine constructed in accordance with the teachings of the present disclosure is generally referred to by reference numeral 100, is disclosed. As shown, the gas turbine engine 100 may include an engine housing 102, with engine supports 104 connecting internal components of the gas turbine engine 100 to the engine housing 102. In addition, the engine 100 may include a plurality of axially aligned components starting with a compressor section 106. The compressor section 106 draws in ambient air 107 and compresses same to form compressed air 108. The compressor section 106 may include a plurality of blades 109 radially extending from a first end 110 of a shaft 112. The shaft 112 may run through the radial center 114 of the gas turbine engine 100.

A portion of the compressed air 108 enters a combustor 116, disposed downstream of the compressor section 106, as combustion air 118, and a remainder of the compressed air 108 is used as cooling air 120 as will be described in further detail herein. After being mixed with fuel delivered by fuel injectors 121 and ignited, exhaust gases 122 are generated.

The hot and expanding exhaust gases 122 then pass through a turbine section124 disposed axially downstream of the combustor 116. Similar to the compressor section 106, the turbine section 124 may include a plurality of blades 126. The turbine blades 126 may be connected to a second end 128 of the shaft 112. The exhaust gases 122 cause the turbine section 124 to rotate, which in turn causes the compressor section 106 to rotate as well.

As seen in FIG. 2, the combustor 116 may include a combustion chamber 130 that may be defined by an outer combustor shell 132 and an inner combustor shell 133. In the depicted embodiment, the combustor chamber 130 is annular in shape. A plurality of the fuel injectors 121 may be circumferentially arrayed around the annular combustion chamber 116 and be positioned such that fuel may be injected into the combustion chamber 130 at desired locations for most effective combustion. As also shown in FIG. 2, the outer combustor shell 132 may have an outer liner 135 disposed radially inward from the outer combustor shell 132. Similarly, the inner combustor shell 133 may have an inner liner 137 disposed radially outward from the inner combustor shell 133. In so doing, it can be seen that the inner combustor shell 133 and inner liner 137 are radially inside of the outer combustor shell 132 and outer liner 135 and thereby cooperate to define the annularly shaped combustion chamber 130. Moreover, the outer liner 135 and inner liner 137 cooperate to form a barrier protecting the outer combustor shell 132 and inner combustor shell 133, respectively, from the high temperature exhaust gases 122 within the combustion chamber 130.

As indicated above, not all of the compressed air 108 is used for combustion. Rather, some compressed air 108 is used to cool the engine 100 as well. In order to do so, flowpaths for the cooling air 120 are provided. More specifically, air passages 138 are formed between the outer combustor shell 132 and the outer liner 135, and between the inner combustor shell 133 and the inner liner 137. The air passages 138 allow the cooling air 120 to pass therethrough to cool backsides 139 of both liners 135 and 137. In addition, a plurality of air injection holes 140 may be provided in the outer liner 135 and inner liner 137 to allow the cooling air 120 to pass from the air passages 138 and through the liners 135 and 137. In so doing, the cooling air 120 gains access to inside surfaces 141 of the outer liner 135 and inner liner 137, thereby reducing the temperature of the liners 135 and 137 from both sides.

As also shown in FIG. 2, at least one igniter 142 is provided to ignite the air and fuel mixture within the combustion chamber 130. An igniter opening 144 is accordingly provided through the outer combustor shell 132 and outer liner 135 to allow for the igniter 142 to be mounted and extend therethrough. In some embodiments, the outer liner 135 is formed from a series of panels arrayed in annular fashion, and the actual panel in which the igniter 142 is mounted is referred to as the "igniter panel", but this is not always the case and for purposes of this specification it is important to simply understand that the igniter panel is just a part of the outer liner 135.

The igniter opening 144 terminates at, and is defined by, a grommet 146. The grommet 146 may be unitary with the outer liner 135 or be a separate piece mounted therein. In order to ensure the cooling air 120 does not undesirably pass around the igniter 142 through the igniter opening 144, a slider seal assembly 148 may be disposed proximate the igniter opening 144 to receive the igniter 142 in fluid tight fashion. While grommets and slider seals have been known in the prior art in this regard, the present disclosure drastically departs from conventional approaches by providing cooling passages in the grommet as will now be described in further detail.

Figure 3:
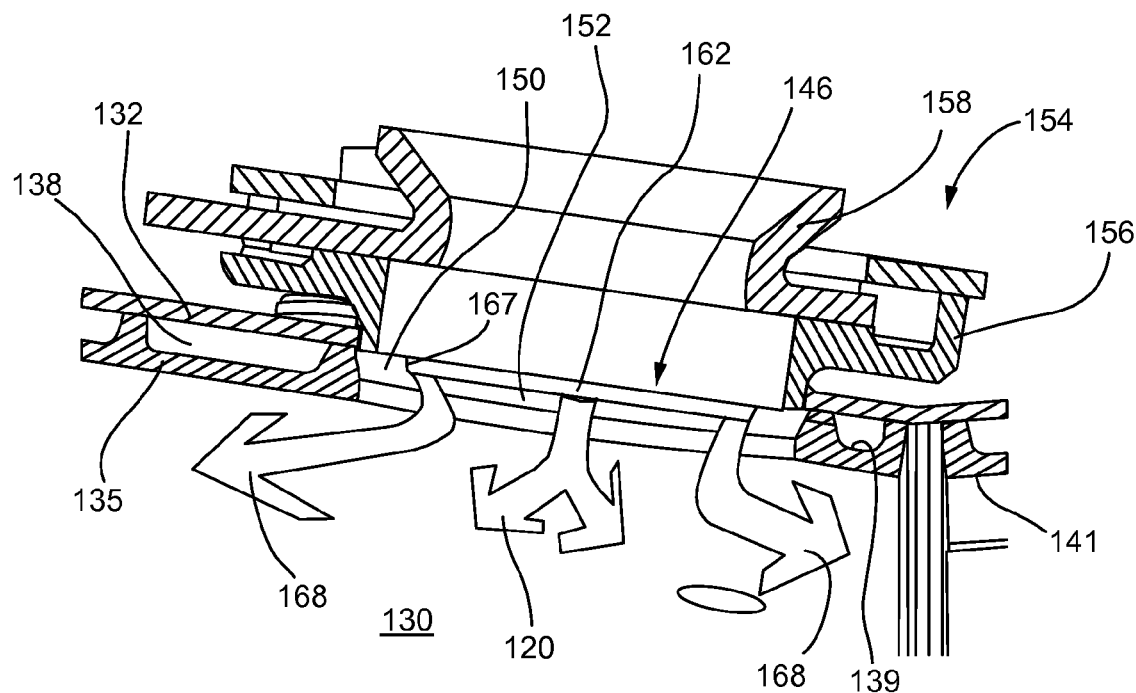
FIG. 3 is a sectional view of a combustor liner, grommet, and sliding seal assembly constructed in accordance with one embodiment of the present disclosure.
Figure 4:
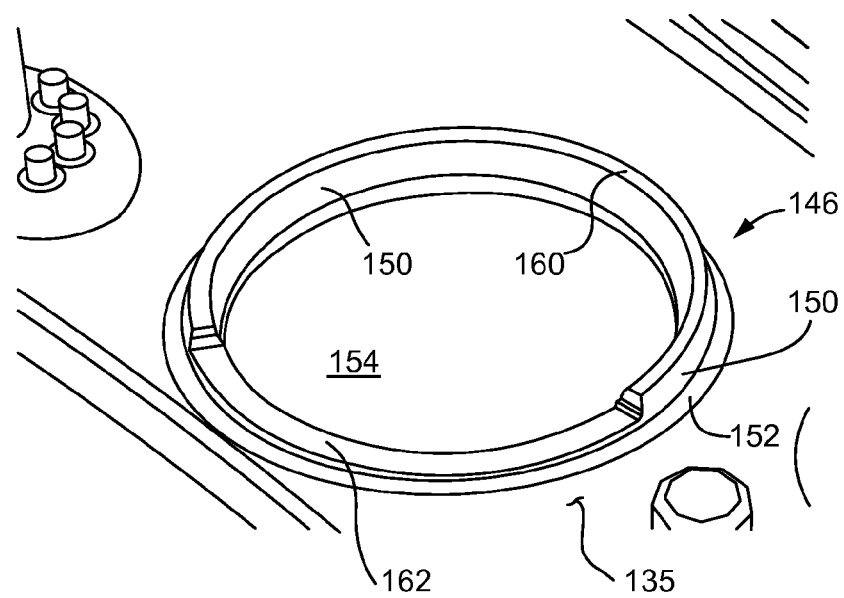
FIG. 4 is a perspective view of the combustor liner and grommet of FIG. 3.

Referring now to FIGS. 3 and 4, a first embodiment of the grommet 146 is shown in further detail. As shown, the grommet 146 may include a peripheral, generally cylindrical, wall 150 upwardly extending from a circumferential flange 152. The peripheral wall 150 defines a grommet interior aperture 154 which may extend toward the combustion chamber 130 within the igniter opening 144. However, it is to be understood that the grommet 146 of the present disclosure need not be used only within igniter openings, but rather could be employed with equal efficacy with other openings including, but not limited to, nozzles openings, dilution holes, and the like.

The slider seal assembly 148 may include a slider seal housing 156 and a slider seal 158. The slider seal housing 156 may be mounted to outer combustor shell 132, with the slider seal 158 mounted onto the slider seal housing 156. The slider seal 158 may prevent passage of the air-fuel mixture from the combustion chamber 130 into the free space of the engine 100 or the atmosphere, while at the same time preventing cooling air 120 from entering the combustion chamber 130 through the grommet interior aperture 154. In addition, the outer combustor shell 132 may be disposed on a top surface 160 of the grommet wall 150 to further prevent passage of cooling air 120.

While conventional grommets and sliders seals are known, as indicated above, as modern engine temperatures have increased, cracks or other deformations in inner liner or grommet have become increasingly common. In order to combat this phenomenon, the present disclosure provides the grommet 146 with one or more machined slots or apertures to thereby provide a flow path for cooling air 120. Starting with the embodiment of FIGS. 3 and 4, it can be seen that grommet wall 150 may be provided with one large machined slot 162. In so doing, the cooling air 120 is able to pass through the grommet wall 150 through the machined slot 162 and thus provide cooling air 120 to the area around the grommet 146. In the depicted embodiment, the machined slot 162 extends around about 126° of the 360° circumference of the grommet wall 150, but in other embodiments, arcs of different lengths are certainly possible.

Figure 5:
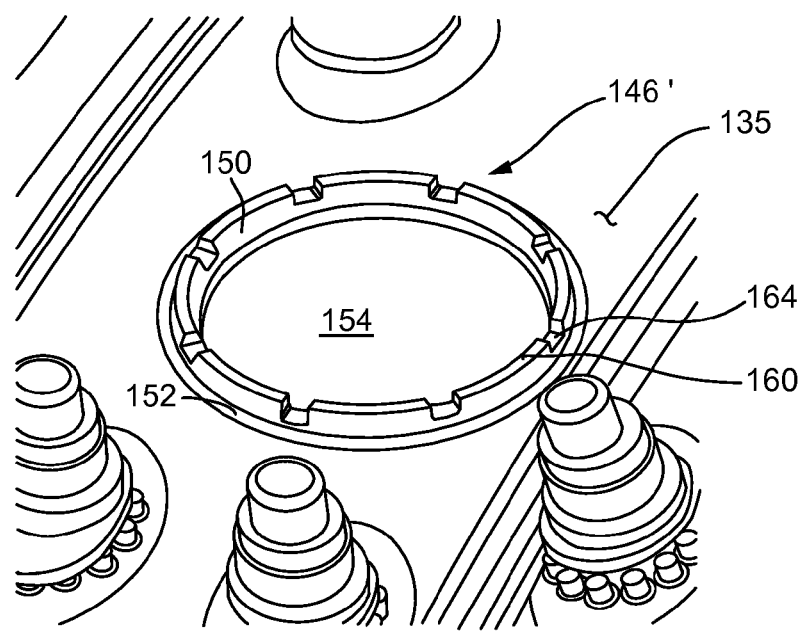
FIG. 5 is a perspective view of a combustor liner and grommet constructed in accordance with another embodiment of the present disclosure.
Figure 6:
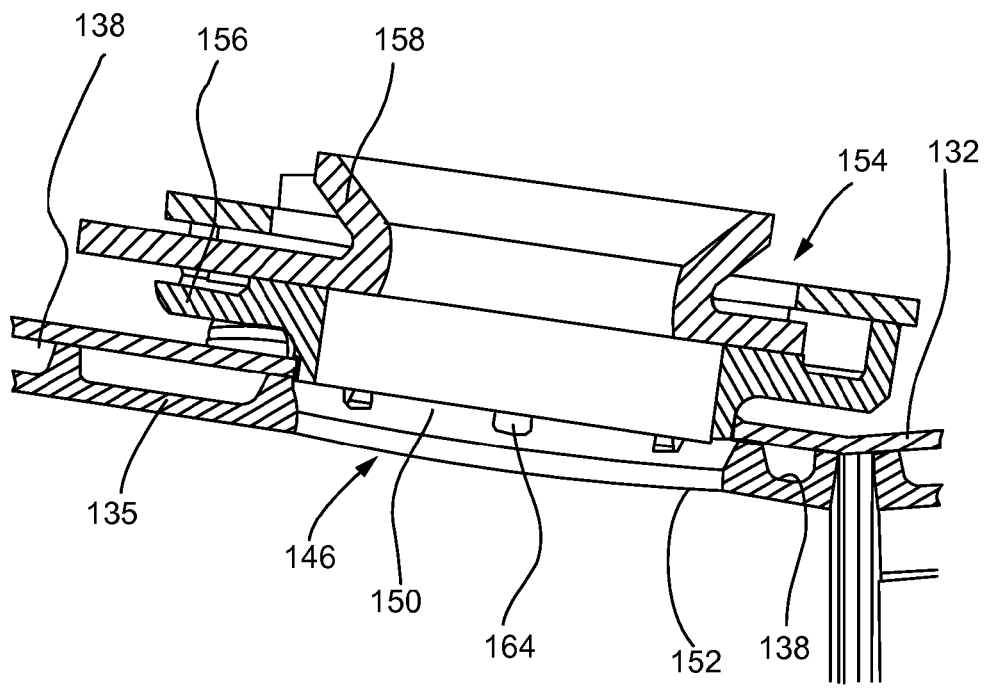
FIG. 6 is a sectional view of the combustor liner and grommet of FIG. 5, along with a sliding seal assembly.

Shown in FIGS. 5 and 6 is another embodiment of grommet 146 of the present disclosure. In this embodiment, as opposed to one large slot 162, the grommet wall 150 may include a plurality of slots 164 spaced circumferentially around the grommet wall 150. The slots 164 may occupy any desirable percentage of the overall area of the wall 150, but in one embodiment forming the grommet wall 150 with about 35% of the grommet wall 150 being so slotted was found to be effective. In other embodiments, a different number of slots 164 may be disposed in the grommet wall 150, and each slot 164 may be sized to occupy a greater or lesser percentage of the overall area of the grommet wall. Moreover, the slots 164 need not be equidistantly spaced around the circumference of the wall 150 as shown, and may span less than the full 360 degree circumference of the grommet wall 150.

Figure 7:
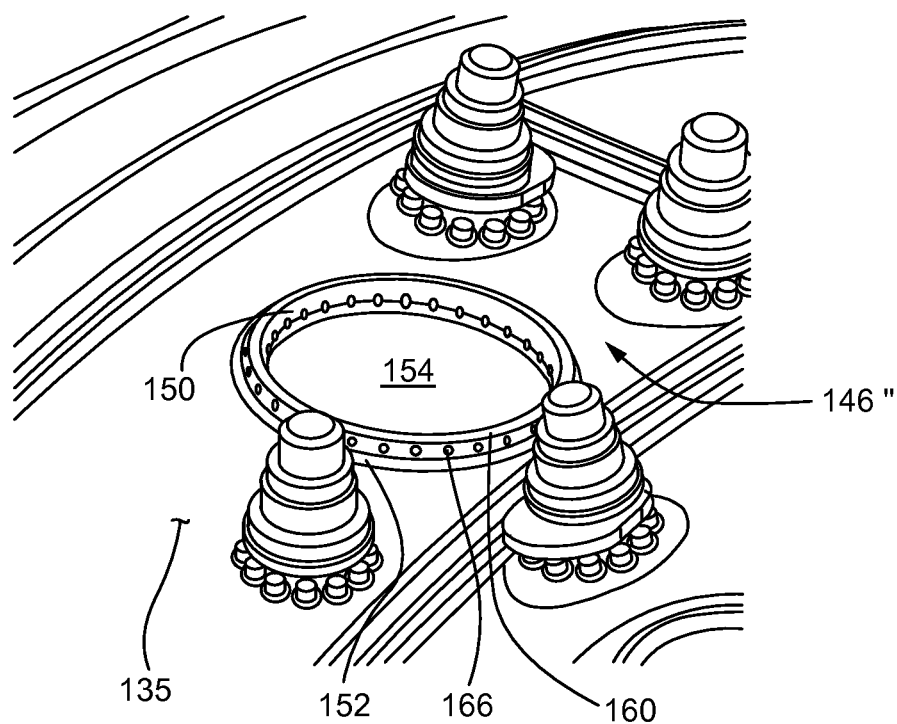
FIG. 7 is a perspective view of a combustor liner and grommet constructed in accordance with yet another embodiment of the present disclosure.
Figure 8:
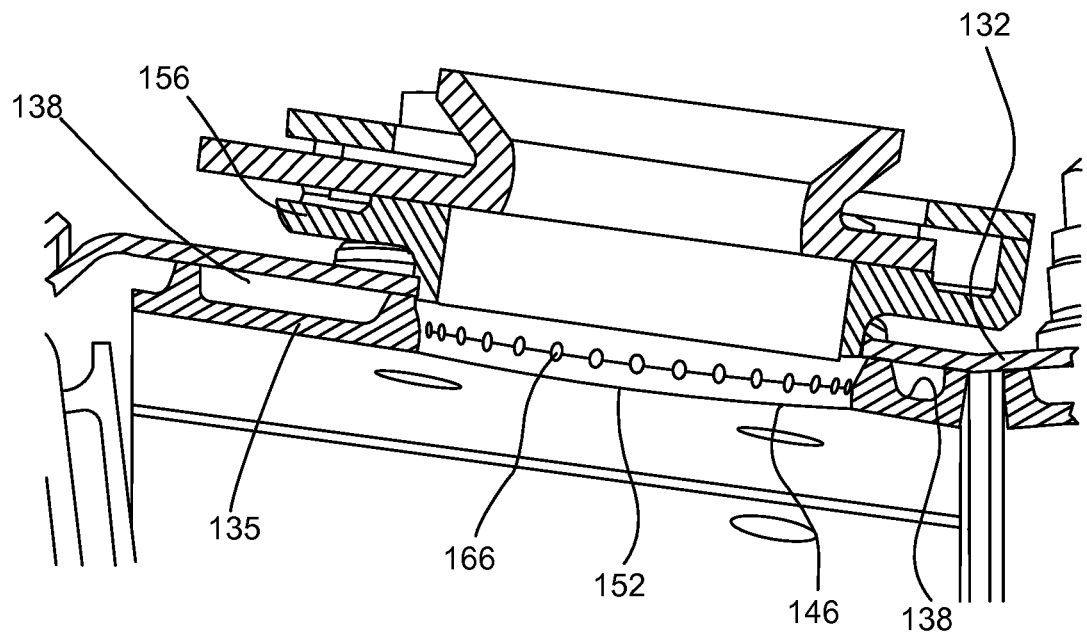
FIG. 8 is a sectional view of the combustor line and grommet of FIG. 7, along with a sliding seal assembly.

FIGS. 7 and 8 show yet another embodiment of the grommet 146 of the present disclosure. In this embodiment, as opposed to providing slots in the grommet wall which extend all the way to and through the top surface 160, passageways for the cooling air 120 may be provided in the form of one or more holes 166. There may be any number of holes 166 in the grommet wall 150 wherein each of the holes 166 may have any desired dimensions. In one embodiment, the holes 166 may occupy about 35% of the overall area of the grommet wall 150, but different percentages and hole sizes are certainly possible.

As used herein, a "hole" is generally defined as a machined perforation in the grommet wall 150 surrounded on all sides by the grommet wall 150, whereas a "slot" is generally defined as a machined opening in the grommet wall 150 which is not surrounded on all sides by the grommet wall 150. Regardless of whether "holes" or "slots" are used, each may be referred to as a "channel" or "cooling air flow channel" herein.

In operation, it can therefore be seen that the present disclosure operates by providing a cooling air flowpath through the igniter panel grommet 146 to thus cool the grommet 146 and outer liner 135. More specifically, the entire cooling air flow path will now be described. Starting at the compressor 106, ambient air 107 is drawn in and compressed to from compressed air 108. That compressed air 108 is then bifurcated, with a portion being split off to form cooling air 120. The cooling air 120 then passes into the air passages 138 by way of the air injection holes 140. While within the air passages 138, the cooling air 120 is able to cool the backsides 139 of the outer liner 135. Part of the cooling air 120 then passes through the outer liner 135 toward the combustion chamber 130 to cool the inside surfaces 141 of the outer liner 135 as well.

At the same time, a portion of the cooling air 120 may enter the combustor 116 through at least one of the slots 162 or 164 or holes 166 formed in the grommet wall 150 depending on the embodiment employed. More specifically, in the embodiment of FIGS. 3 and 4, the cooling air 120 may flow through the large machined slot 162 and follow an inside surface 167 of the grommet wall 152 to the hot inside surface 141 of the outer liner 135. At the hot inside surface 141, the cooling air 120 may enter the combustion chamber 130 or turn downstream to create a cooling film 168 along the hot inside surface 141 of the outer liner 135, thus cooling same. In one test of an engine 100 constructed in this style, the temperature of the grommet 146 and the outer liner 135 proximate the grommet 146 was reduced by as much as 200 degrees Fahrenheit, but other reductions are possible.

Similarly, in the embodiment of the present disclosure shown in FIGS. 5 and 6, the cooling air 120 may pass through the multiple slots 164, while in the embodiment of FIGS. 7 and 8, the cooling air 120 may pass through the plurality of holes 166. In either event, the cooling air 120 is being communicated to the hot surfaces of the grommet 146 and outer liner 135, thereby cooling an area of the engine 100 that heretofore has suffered from heat stress and potentially cracking.

INDUSTRIAL APPLICABILITY

From the foregoing, it can be seen that the technology disclosed herein has industrial applicability in a variety of settings such as, but not limited to cooling grommets of a combustor liner and the combustor liner around such grommets in a gas turbine engine. The gas turbine engine may be used in conjunction with an aircraft for generating thrust, or in land-based applications for generating power. Using the teachings of the present disclosure, a combustor liner and a combustor liner grommet may be constructed to increase cooling flow to reduce the temperature of the grommet and the combustor liner around the grommet This improvement over the prior art may prevent cracking of the combustor liner around the grommet during operation, and thus improve the operation and serviceable life of the engine.

While the present disclosure has been in reference to a gas turbine engine and an aircraft, one skilled in the art will understand that the teachings herein can be used in other applications as well. It is therefore intended that the scope of the invention not be limited by the embodiments presented herein as the best mode for carrying out the invention, but that the invention will include all embodiments falling within the scope of the claims.

What is claimed is:

1. A grommet of a combustor liner, wherein the combustor liner is associated with an outer combustor shell, the grommet comprising:
   a circumferential flange;
   a peripheral wall upwardly extending from the circumferential flange, defining a hole in the combustor liner, the peripheral wall having a top surface, wherein the outer combustor shell is disposed on the top surface of the peripheral wall;
   a cooling air flow channel in the peripheral wall; and
   wherein the cooling air flow channel is a slot having an end abutting an air passage located between the outer combustor shell and the combustor liner, wherein the slot is disposed between the circumferential flange and the outer combustor shell, wherein the peripheral wall has a circumference defined entirely by a first circumferential portion and a second circumferential portion, and the slot spans at least 126 degrees around the circumference of the peripheral wall, thereby forming the first circumferential portion, wherein the second circumferential portion is a continuous grommet wall of the peripheral wall, complementing the first circumferential portion to form a full circle.

2. A combustor liner associated with an outer combustor shell, the combustor liner comprising:
   a panel at least partially defining a combustion chamber, the panel having at least one opening;
   a grommet proximate the at least one opening, the grommet comprising:
   a circumferential flange;
   a peripheral wall upwardly extending from the circumferential flange, defining a hole in the combustor liner, the peripheral wall having a top surface, wherein the outer combustor shell is disposed on the top surface of the peripheral wall;
   a cooling air flow channel in the peripheral wall; and
   wherein the cooling air flow channel is a slot having an end abutting an air passage located between the outer combustor shell and the combustor liner, wherein the slot is disposed between the circumferential flange and the outer combustor shell, wherein the peripheral wall has a circumference defined entirely by a first circumferential portion and a second circumferential portion, and the slot spans at least 126 degrees around the circumference of the peripheral wall, thereby forming the first circumferential portion, wherein the second circumferential portion is a continuous grommet wall of the peripheral wall, complementing the first circumferential portion to form a full circle.

3. The combustor liner of claim 2, wherein the at least one combustor liner panel opening is adapted to receive an igniter.

4. A method of cooling a combustor liner and a grommet, comprising:
   providing the grommet at an opening of the combustor liner, the grommet having a circumferential flange; a peripheral wall upwardly extending from the circumferential flange, defining a hole in the combustor liner, the peripheral wall having a top surface, wherein an outer combustor shell is disposed on the top surface of the peripheral wall; a cooling air flow channel in the peripheral wall; and wherein the cooling air flow channel is a slot having an end abutting an air passage located between the outer combustor shell and the combustor liner, wherein the slot is disposed between the circumferential flange and the outer combustor shell, wherein the peripheral wall has a circumference defined entirely by a first circumferential portion and a second circumferential portion, and the slot spans at least 126 degrees around the circumference of the peripheral wall, thereby forming the first circumferential portion, wherein the second circumferential portion is a continuous grommet wall of the peripheral wall, complementing the first circumferential portion to form a full circle and
   communicating cooling air through the cooling air flow channel.

5. The method of claim 4, further including providing the grommet at an igniter opening in the combustor liner, positioning an igniter in the igniter opening, and communicating the cooling air through the cooling air flow channel proximate the igniter.

6. The method of claim 4, further including creating a film of cooling air exiting the cooling air flow channel against an inside surface of the combustor liner.

7. The method of claim 4, further including cooling the grommet and combustor liner by at least 200 degrees Fahrenheit with the cooling air exiting the cooling air flow channel.

* * * * *